US012244048B2

(12) United States Patent
Geiler

(10) Patent No.: US 12,244,048 B2
(45) Date of Patent: Mar. 4, 2025

(54) FREQUENCY SELECTIVE LIMITER HAVING AN ENHANCED BANDWIDTH

(71) Applicant: Metamagnetics, Inc., Westborough, MA (US)

(72) Inventor: Michael Geiler, Boston, MA (US)

(73) Assignee: Metamagnetics Inc., Marlborough, MA (US)

(*) Notice: Subject to any disclaimer, the term of this patent is extended or adjusted under 35 U.S.C. 154(b) by 271 days.

(21) Appl. No.: 17/804,151

(22) Filed: May 26, 2022

(65) Prior Publication Data

US 2022/0285813 A1 Sep. 8, 2022

Related U.S. Application Data

(63) Continuation of application No. 16/871,553, filed on May 11, 2020, now Pat. No. 11,349,185.

(60) Provisional application No. 62/846,103, filed on May 10, 2019.

(51) Int. Cl.
*H01P 1/218* (2006.01)
*H01P 11/00* (2006.01)

(52) U.S. Cl.
CPC ............ *H01P 1/218* (2013.01); *H01P 11/007* (2013.01)

(58) Field of Classification Search
CPC ........ H03H 2/001; H03H 7/0107; H01P 1/23; H01P 1/2039; H01P 1/218; H01P 1/227; H01P 1/215; H01P 9/00; H01P 1/365; H01P 11/007; H01P 9/02
See application file for complete search history.

(56) References Cited

U.S. PATENT DOCUMENTS

| | | | | |
|---|---|---|---|---|
| 4,199,737 A * | 4/1980 | Patterson | H03H 2/001 333/156 |
| 4,283,692 A | 8/1981 | Adam | |
| 4,845,439 A | 7/1989 | Stitzer et al. | |
| 5,023,573 A * | 6/1991 | Adam | H01P 1/215 333/17.2 |
| 5,170,137 A | 12/1992 | Woermbke et al. | |
| 5,523,725 A * | 6/1996 | Ishikawa | H01P 1/23 333/201 |
| 5,663,698 A | 9/1997 | Okada et al. | |
| 5,701,108 A | 12/1997 | Fujii et al. | |
| 5,781,079 A * | 7/1998 | Okada | H03H 2/001 333/202 |

(Continued)

OTHER PUBLICATIONS

Zheng et al. "Study on low-cost QFN packages for high-frequency applications," 2012 IEEE 14th Electronics Packaging Technology Conference (EPTC), Singapore, 2012, pp. 401-406, doi: 10.1109/EPTC.2012.6507116 (Year: 2012).*

(Continued)

*Primary Examiner* — Lincoln D Donovan
*Assistant Examiner* — Tyler J Pereny
(74) *Attorney, Agent, or Firm* — Daly, Crowley, Mofford & Durkee, LLP; Michael Van Handel

(57) ABSTRACT

Methods and apparatus for providing a frequency selective limiters (FSL) having a free-standing Yttrium Iron Garnet (YIG) film with first and second opposing surfaces. A metal plane is disposed on one surface of the YIG film to provide the YIG film with a metalized surface. At least one transducer is disposed on the other surface of the YIG film with a respective ends coupled to the metalized surface of the YIG film.

20 Claims, 12 Drawing Sheets

(56) References Cited

U.S. PATENT DOCUMENTS

| | | | | |
|---|---|---|---|---|
| 5,955,987 | A | 9/1999 | Murphy et al. | |
| 6,232,850 | B1 | 5/2001 | Ikari et al. | |
| 6,356,165 | B1 | 3/2002 | Kim et al. | |
| 6,998,929 | B1 | 2/2006 | Adam | |
| 2009/0085695 | A1 * | 4/2009 | Srinivasan ................ | H01P 1/19 333/219.2 |

OTHER PUBLICATIONS

U.S. Appl. No. 16/871,553, filed May 11, 2020, Geiler.
Adam et al., "Magnetostatic Wave Frequency Selective Limiters;" Proceedings of the IEEE Transactions on Magnetics, vol. 49, No. 3; Mar. 2013; 7 Pages.
Adam et al., "Microwave Magnetostatic Delay Devices Based on Epitaxial Yttrium Iron Garnet;" Proceedings of the IEEE, vol. 64, No. 5; May 1976; 8 Pages.
Adam, "A Slot-Line MSW Signal-to-Noise Enhancer;" Proceedings of the IEEE Transactions on Magnetics, vol. MAG-21, No. 5; Sep. 1985; 3 Pages.
Adam, "Mitigate the Interference: Nonlinear Frequency Selective Ferrite Devices;" Proceedings of the IEEE Microwave Magazine, vol. 15, No. 6; Sep./Oct. 2014; 12 Pages.
Adams et al., "MSW Variable Time Delay Techniques;" Final Technical Report RADC-TR-83-139; Rome Air Development Center, Air Force Systems Command; Westinghouse Electric Corporation; Sep. 1983; 189 Pages.
Adkins et al., "Electronically Variable Time Delays Using Cascaded Magnetostatic Delay Lines;" Journal of Applied Physics, vol. 55, No. 2518; Jan. 1984 (Published Online Jun. 4, 1998); 4 Pages.
Cayrefourcq et al., "Optical Switch Design for True Time Delay Array Antenna;" IEE Proceedings —Optoelectronics, vol. 145, No. 1; Feb. 1998; pp. 77-82; 6 Pages.
Clénet, "Visualisation of the Array Factor of Phased Arrays Using Time Delay Units and Digital Phase Shifters;" Proceedings of the IEEE Antennas and Propagation Society International Symposium; Jun. 2002; 4 Pages.
Emtage, "Interaction of Magnetostatic Waves with a Current;" Journal of Applied Physics, vol. 49, No. 4475; Jan. 1978 (Published Online Aug. 12, 2008); 11 Pages.
Glass, "Growth of Thick Single-Crystal Layers of Yttrium Iron Garnet by Liquid Phase Epitaxy;" Journal of Crystal Growth, No. 33; Jan. 1976 (Received Oct. 17, 1975); pp. 183-184; 2 Pages.
Haupt, "Fitting Time Delay Units in a Large Wideband Corporate Fed Array;" Proceedings of the IEEE Radar Conference (RadarCon13); Apr./May 2013; 4 Pages.
Haupt, "Tradeoffs in the Placement of Time Delay in a Large, Wideband Antenna Array;" Proceedings of the 8th European Conference on Antennas and Propagation (EuCAP 2014); Apr. 2014; 2 Pages.
Maxim Integrated, Inc., "SC1894 Hardware Design Guide;" User Guide UG6344; Rev. 2.0; Oct. 2016; Retrieved from https://www.maximintegrated.com/en/app-notes/index.mvp/id/6344 on Apr. 10, 2019; 53 Pages.
Moallemi et al., "Wide Band Programmable True Time Delay Block for Phased Array Antenna Applications;" Proceedings of the IEEE Dallas Circuits and Systems Conference (DCAS); Oct. 10, 2016; 4 Pages.
Serga et al., "YIG Magnonics;" Journal of Physics D: Applied Physics, vol. 43, No. 26; Jan. 2010; 32 Pages.
Yang et al., "Phased-Array Beam Steering Using Optical True Time Delay Technique;" Optics Communications, 350; Jan. 2015; 7 Pages.
Zhang et al., "Compact Size Multi-Channel True Time Delay Moudle with High Accuracy;" Proceedings of the 2018 China International SAR Symposium (CISS); Oct. 2018; 4 Pages.
Restriction Requirement dated Jul. 20, 2021 for U.S. Appl. No. 16/871,553, 5 pages.
Response to Restriction Requirement dated Jul. 20, 2021 filed on Sep. 7, 2021 for U.S. Appl. No. 16/871,553, 1 page.
Office Action Dated Sep. 14, 2021 for U.S. Appl. No. 16/871,553, 10 pages.
Response to Office Action Dated Sep. 14, 2021 filed on Jan. 10, 2022 for U.S. Appl. No. 16/871,553, 7 pages.
Notice of Allowance dated Feb. 3, 2022 for U.S. Appl. No. 16/871,553, 7 pages.

* cited by examiner

FREQUENCY SELECTIVE LIMITER HAVING AN ENHANCED BANDWIDTH

CROSS REFERENCE TO RELATED APPLICATION

This application is a continuation of application Ser. No. 16/871,553 filed May 11, 2020, now U.S. Pat. No. 11,349,185 issued May 31, 2022, which claims the benefit of U.S. Provisional Patent Application No. 62/846,103, filed on May 10, 2019, which is incorporated herein by reference.

BACKGROUND

As is known in the art, conventional frequency selective limiters (FSLs) have been limited in instantaneous bandwidth and maximum operating frequency. Conventional FSLs are made using Yttrium Iron Garnet (YIG) grown on Gadolinium Gallium Garnet (GGG) using Liquid Phase Epitaxy. In prior art FSLs, a YIG film layer grown by liquid phase epitaxy on a GGG substrate is used to realize devices capable of functions like RF filtering, frequency selective limiting, and time delay over limited frequency ranges (bandwidths).

Some known FSLs are magnetostatic surface wave (MSSW) devices. The operating frequency of the MSSW FSL is limited by the dispersion characteristics of magnetic spinwaves, including MSSWs and half-frequency (w/2) spinwaves. The YIG film is attached to the GGG, so only one side is free to be placed adjacent an MSSW transducer.

The theory of MSSW transducers and devices is well known to those skilled in the art. FIGS. 1 and 1A show, respectively, so-called "Type A" and "Type B" prior art configurations of MSSW transducers having YIG films on a GGG substrate. Adam describes a "Type A" MSSW FSL in "Magnetostatic Wave Frequency Selective Limiters" IEEE TRANSACTIONS ON MAGNETICS, VOL. 49, NO. 3, MARCH 2013, which is incorporated herein by reference. Emtage describes theoretically the "Type B" transducer, but does not describe a FSL in "Interaction of magnetostatic waves with a current" Journal of Applied Physics 49, 4475 (1978), which is incorporated herein by reference.

Adam's publication titled "Microwave Magnetostatic Delay Devices Based on Yttrium Iron Garnet" Proceedings of the IEEE, Vol. 64, No. 5 May 1976 and Patterson, O'Keefe and Adam's U.S. Pat. No. 4,199,737 "Magnetostatic Wave Device," which is incorporated herein by reference, describes the MSSW transduction and propagation, including the theoretical description of physics, but does not describe an FSL. The realization of practical circuit topologies that enable the enhanced bandwidth of MSSW transducers for FSL devices is difficult.

Adam describes a MSSW Signal-to-Noise enhancer device with improved bandwidth in "A SLOT-LINE MSW SIGNAL-TO-NOISE ENHANCER" 1794 IEEE TRANSACTIONS ON MAGNETICS, VOL. MAG-21, NO. 5, SEPTEMBER 1985, building on prior art U.S. Pat. No. 4,283,692A "Magnetostatic wave Signal-to-Noise enhancer," both of which are incorporated herein by reference. However, the slot-line embodiment requires the use of non-trivial microstrip to slot-line converters, and does not apply to FSLs, but rather apply to signal-to-noise enhancers.

Another way to increase the bandwidth of an MSSW device is to reduce the magneto-crystalline anisotropy of the magnetic film by growing the film on various crystallographic planes of the seed crystal. This allows for achieving lower operating frequency, but not higher. This is described in U.S. Pat. No. 6,232,850B1 "Magnetostatic wave device with specified angles relating the transducer, magnetic thin film, and bias magnetic field," which is incorporated herein by reference, but does not apply to FSLs.

Adam describes a MSSW FSL in U.S. Pat. No. 6,998,929 B1 "Low Threshold Power Frequency Selective Limiter for GPS," which is incorporated herein by reference, that uses a YIG film on a GGG substrate, placed film side down on top of a pair of short circuited microstrip transducers which were fabricated on a dielectric substrate. Adam '929 is based on prior art by Murphy and Littlepage in U.S. Pat. No. 5,955,987 "Hybrid Radio Frequency System With Distribution Anti-Jam Capabilities for Navigation Use," which are incorporated herein by reference.

SUMMARY

The concepts, systems, circuits and devices described herein relate to frequency selective limiters (FSL) capable of operating over a wide frequency range and which may be implemented using microstrip transducers, for example. In accordance with the concepts, systems, circuits and techniques described herein, described are circuit topologies that result in enhanced bandwidths of FSL devices. In embodiments, FSL devices are magnetostatic surface wave (MSSW) type devices.

A frequency selective limiter (FSL) refers to a nonlinear passive device that attenuates radio frequency (RF) signals provided to an input thereof having a power level which is above a predetermined threshold power level. Hence, FSLs are said to limit the amount of power of an RF signal. RF Signals having a power level below the predetermined threshold power, on the other hand, propagate from the FSL input port to the FSL output port substantially unattenuated.

One feature of an FSL device is the frequency selective nature of the high-power limiting. Specifically, an FSL has a characteristic in which lower power signals (i.e., signals having a power level below the threshold power lever) close in frequency to the limited signals are substantially unaffected (i.e., the FSL does not substantially attenuate such signals).

In embodiments, described is the use of a free-standing YIG crystal. For the case of YIG grown using liquid phase epitaxy (LPE), the YIG crystal is grown over a GGG substrate and is then subsequently separated from the substrate to provide a free-standing YIG crystal film. As used herein, a free-standing YIG film refers to a film that has been separated from a substrate used to form the YIG film.

In embodiments, the YIG film is initially deposited (e.g. using LPE) or otherwise provided over a GGG substrate. The GGG substrate can be removed to provide a free-standing YIG crystal film. The YIG may be polished to provide desired surface characteristics. In some embodiments, the free-standing YIG crystal can be bonded to an RF ground plane. Wirebonds may be disposed across the YIG from input to ground and from output to ground. This approach results in a very compact and low cost FLS.

In embodiments, the free YIG crystal can be bonded directly to a ground plane in an integrated circuit (IC) package, such as a quad-flat no lead (QFN) semiconductor IC package. Wire bonds can be used to form the transducers inside the IC package.

By using a thin (e.g. 100 microns or less), free-standing YIG film, the device can be provided in a novel Type B configuration (see, e.g., FIG. 2), with one surface of the YIG film covered (and in some cases completely covered) by metal. Since the YIG film is thin, transducers placed on the non-metallized surface of the YIG film are sufficiently close to launch MSWs on both the metallized and non-metallized surfaces of the YIG film. In example embodiment, the YIG film has a thickness in a range of about 50 to about 500 microns.

One advantage of the described concepts, structures and techniques over prior art approaches for increasing the maximum frequency of FSLs is that the described concepts, structures and techniques require no exotic circuit types or materials. The separation of the GGG substrate from the YIG film facilitates placement of one surface of the YIG film on a conductive plane, while also allowing conventional transducer design techniques to be employed on the opposing surface of the YIG film.

In one aspect, a frequency selective limiter (FSL) device comprises: a free-standing Yttrium Iron Garnet (YIG) film having first and second opposing surfaces; a metal layer disposed on a first one of the first and second opposing surfaces of the YIG film to provide the YIG film with a metalized surface; and a first transducer disposed on a second one of the first and second surfaces of the YIG film.

An FSL device can further include one or more of the following features: the metal layer comprises an RF ground plane, the YIG film has a thickness in a range of about 50 to about 500 microns, the FSL comprises a Type A MSSW FSL device, the FSL comprises a Type B MSSW FSL device, the FSL device comprises a MSSW device, wherein the first transducer has a first end coupled to the metalized surface of the YIG film; and, further including a second transducer disposed on the second one of the first and second surfaces of the YIG film, the second transducer having a first end coupled to the metalized surface of the YIG film, wherein the first and second transducers are configured to launch magnetostatic surface wave (MSSWs) on the first and second surfaces of the YIG film, the first and second transducers comprise microstrip transducers, the first and second transducers comprise stripline transducers, the first and second transducers comprises coplanar waveguide (CPW) transducers, the first and second transducers comprise wirebonds, the metal layer covers an entirety of the first one of the surfaces of the YIG film, the MSSW FSL device is provided as a IC package, the IC package comprises a QFN type package, and/or the IC package comprise conductive vias to electrically couple the first and second transducers to input/output feed circuits.

In another aspect, a method of fabricating an FSL device comprises: depositing at least one transducer on a first side of a YIG film on a GGG wafer; singulating the wafer into individual devices; removing the GGG from a second surface of the YIG film to provide a free-standing YIG film with a free YIG surface; polishing the free YIG surface; disposing an electrically conductive material on the free YIG surface; and electrically coupling the at least one transducers to the electrically conductive material and to input/output feed circuits.

A method can further include growing the YIG film using Liquid Phase Epitaxy on both sides of the GGG wafer and wherein removing the GGG from the surface of the wafer comprises removing a layer of YIG film and removing the GGG, polishing the free YIG surface comprises polishing Chemical Mechanical Polishing (CMP) the YIG surface with colloidal silica nanoparticles to restore the free YIG surface to an optical polish, disposing the electrically conductive material on the free YIG surface comprises at least one of: sputtering a conductor onto the free YIG surface; and/or adhering the free YIG surface to a surface of a metal ground, before the removal of the GGG layer from the YIG film, covering the free surface of the YIG film with the electrically conductive material, the FSL device comprises a Type A MSSW FSL device, the FSL device comprises a Type B MSSW FSL device, after the GGG is removed and the YIG is polished, disposing the YIG film directly on a pair of Type A transducers, providing interconnects to connect to an RF ground plane, fabricating the FSL device without any metal deposition or processing on the YIG film, the YIG film is bonded directly to a ground plane in a semiconductor IC package and wire bonds are used to form the transducers inside the IC package, and/or removing the GGG comprises removing the GGG via a lapping procedure.

BRIEF DESCRIPTION OF THE DRAWINGS

The manner and process of making and using the disclosed embodiments may be appreciated by reference to the drawings, in which.

DETAILED DESCRIPTION

Figure 1:
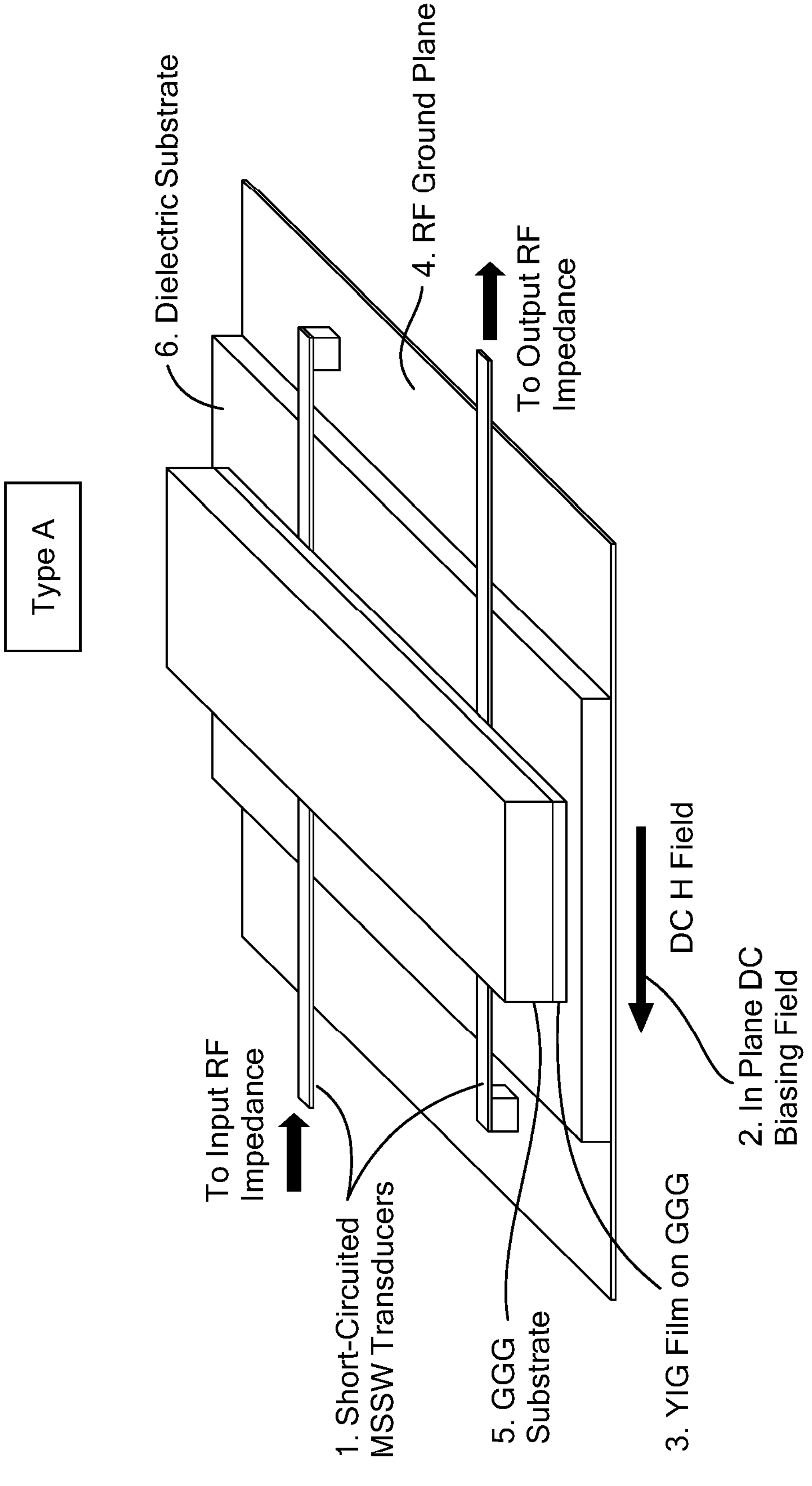
FIG. 1 PRIOR ART
FIGS. 1 and 1A are isometric views of prior art Type A and Type B MSSW transducer topologies.
Figure 1A:
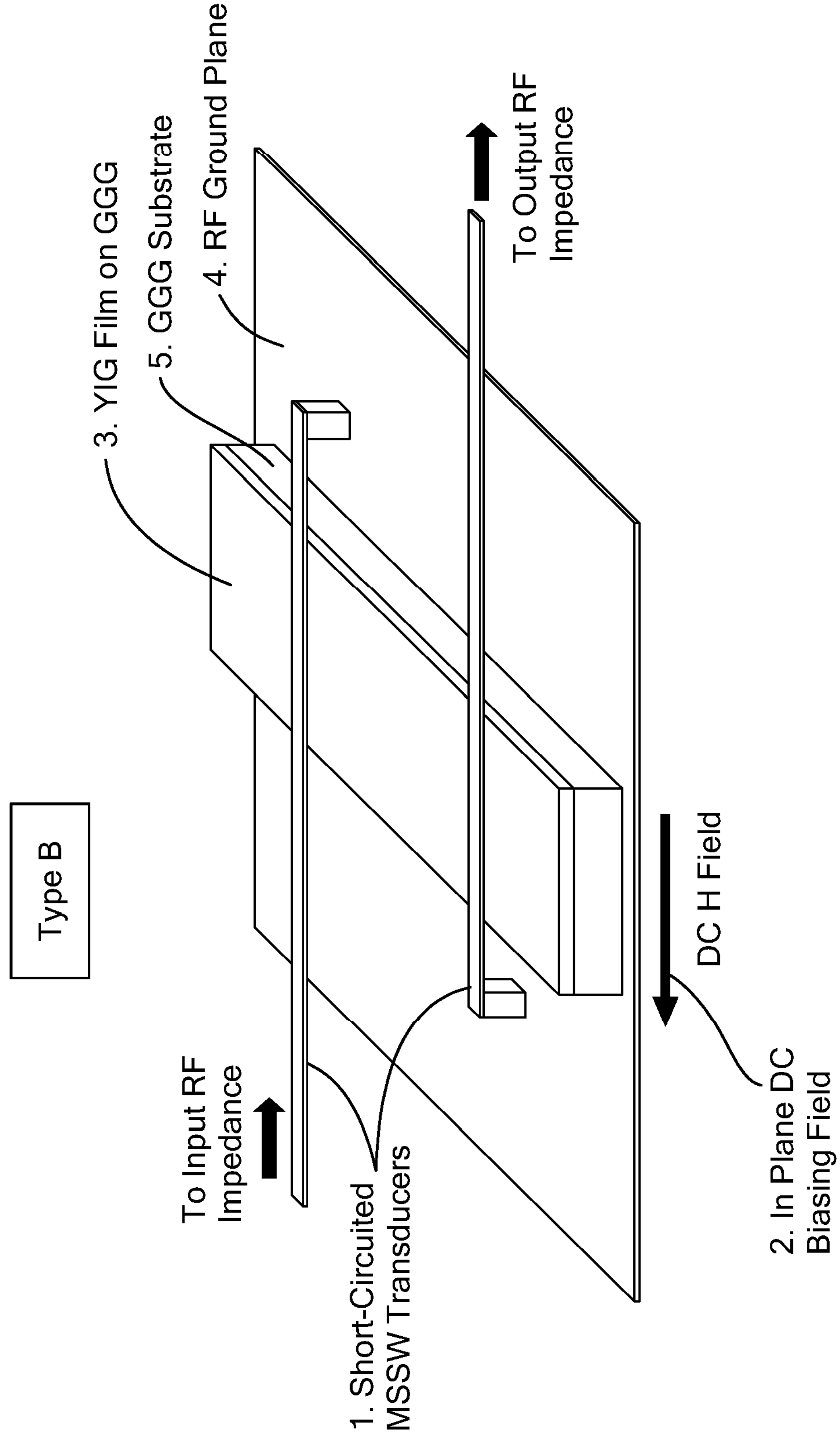
FIG. 1A PRIOR ART
Figure 2A:
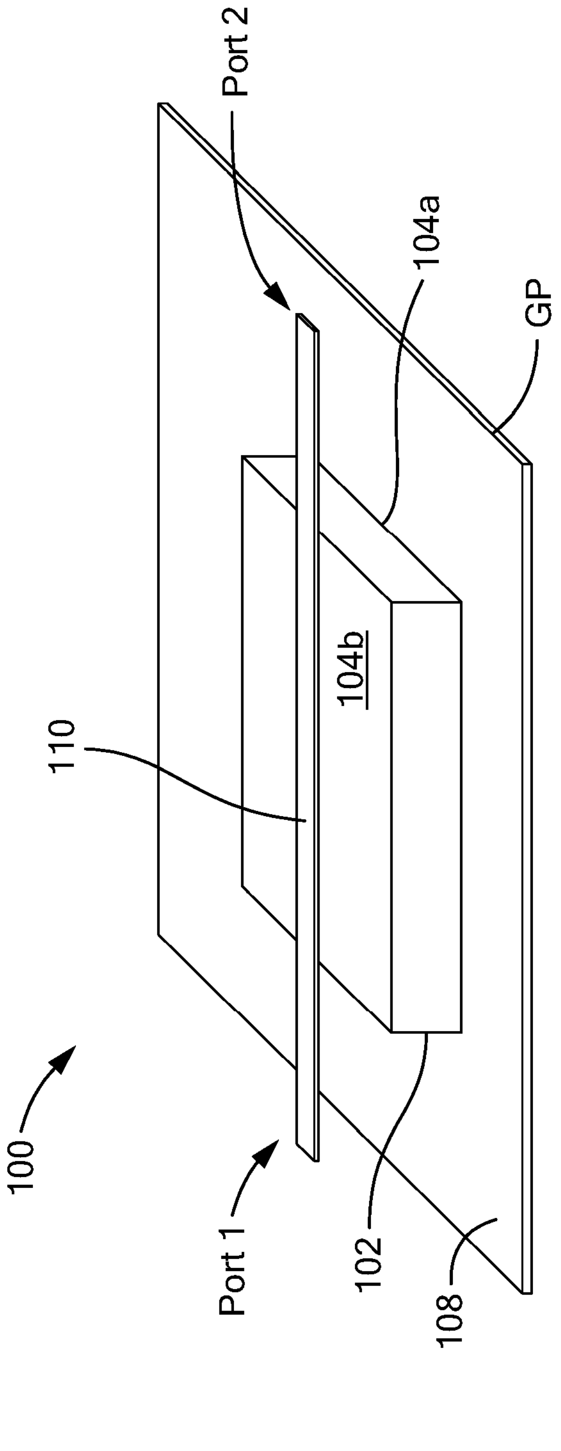
FIG. 2A is an isometric view of an example FSL device in accordance with example embodiments of the invention.

FIG. 2A shows a Type B frequency selective limiter (FSL) 100 having a topology provided in accordance with the concepts disclosed herein. A YIG film 102 has a first surface 104*a* disposed or otherwise provided on a first surface 106 of a conductive layer 108, such as a metal RF ground plane. A transducer 110 is disposed or otherwise provided on a second, opposite surface 104*b* of the YIG film. In example embodiments, the transducer 110 is provided as a microstrip configuration having first and second ports shown as Port 1 and Port 2.

As described more fully below, disposing the free-standing YIG 102 on the metal conductive layer 108 increases the upper cutoff frequency and increases the device bandwidth, as compared to conventional FSL devices having a YIG film on a GGG substrate.

Figure 2B:
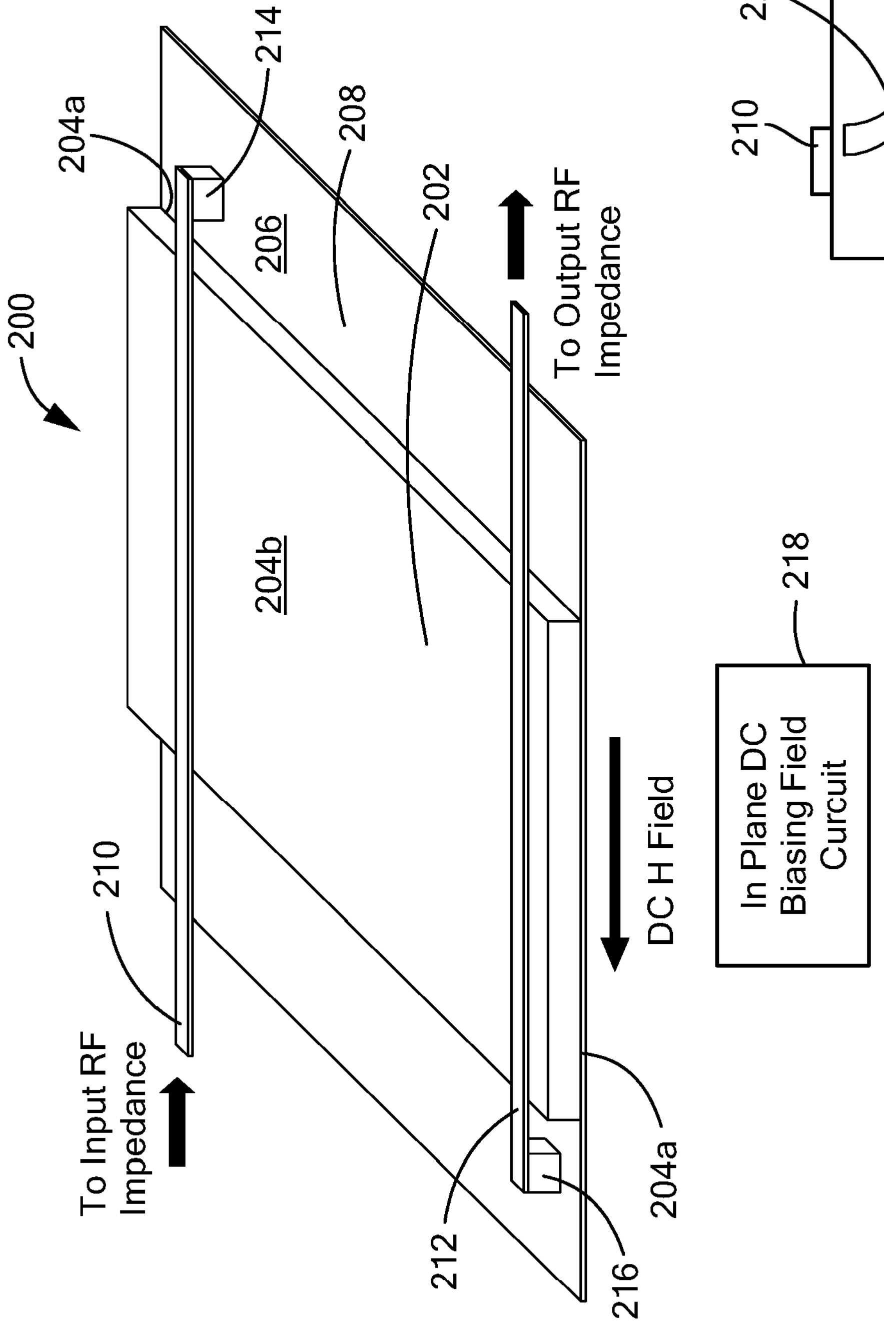
FIG. 2B is an isometric view and FIG. 2C is a cross-sectional view of an example MSSW FSL device in accordance with the concepts disclosed herein.
Figure 2C:
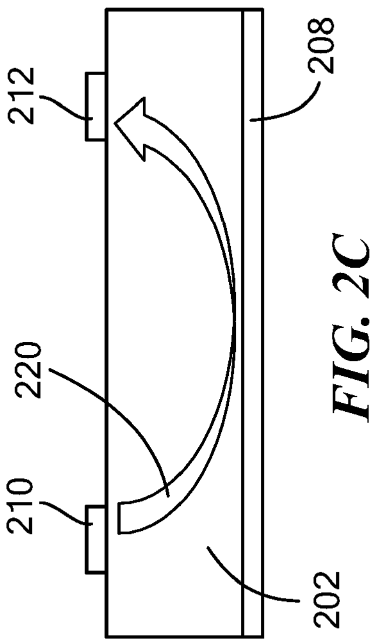

FIGS. 2B and 2C show a Type B frequency selective limiter (FSL) 200 having an MSSW transducer topology provided in accordance with the concepts disclosed herein. A YIG film 202 has a first surface 204*a* disposed or otherwise provided on a first surface 206 of a conductive layer 208, such as a metal RF ground plane 208. First and second MSSW transducers 210, 212 are disposed or otherwise provided on a second, opposite surface 204*b* of the YIG film. The first and second transducers 210, 212 are electrically coupled to the RF ground plane 208. Thus, MSSW transducers maybe referred to as short-circuited MSSW transducers.

In embodiments, the first and second transducers 210, 212 are electrically coupled to the RF ground plane 208 by coupling one end of each transducer to the ground plane, e.g. via a grounding structure, a wire bond, an electrically conductive via, or using any other technique well-known to those of ordinary skill in the art. In the illustrated embodiment, a first end 214 of the first transducer 210 is coupled to the ground plane 208 at a first location on the ground plane and a first end 216 of the second transducer 212 is coupled to the ground plane at a second location. In example embodiments, the grounded ends 214, 216 of the first and second transducers are located at opposite sides of the YIG film 202.

In the illustrated embodiment, a DC biasing field circuit 218 is configured to apply a DC biasing field (e.g., a DC H field, as shown) in a plane parallel to a plane in which the YIG film lies. A variety of suitable DC bias circuits 218 can be used to meet the needs of a particular application.

The structure of FIGS. 2B and 2C utilizes magnetostatic surface waves (MSSWs), launched from the short circuited first and second transducers 210, 212 with the DC magnetic field applied in the plane of the YIG crystal and in parallel with the transducers, which is perpendicular to the direction of MSSW propagation. MSSWs propagate on the surfaces of the YIG film 202, and thus, the materials present at the boundary of the YIG and air play an important role in the dispersion relations of the MSSWs. An illustrative metal mode MSSW propagation path 220 is shown in FIG. 2C.

Figure 3A:
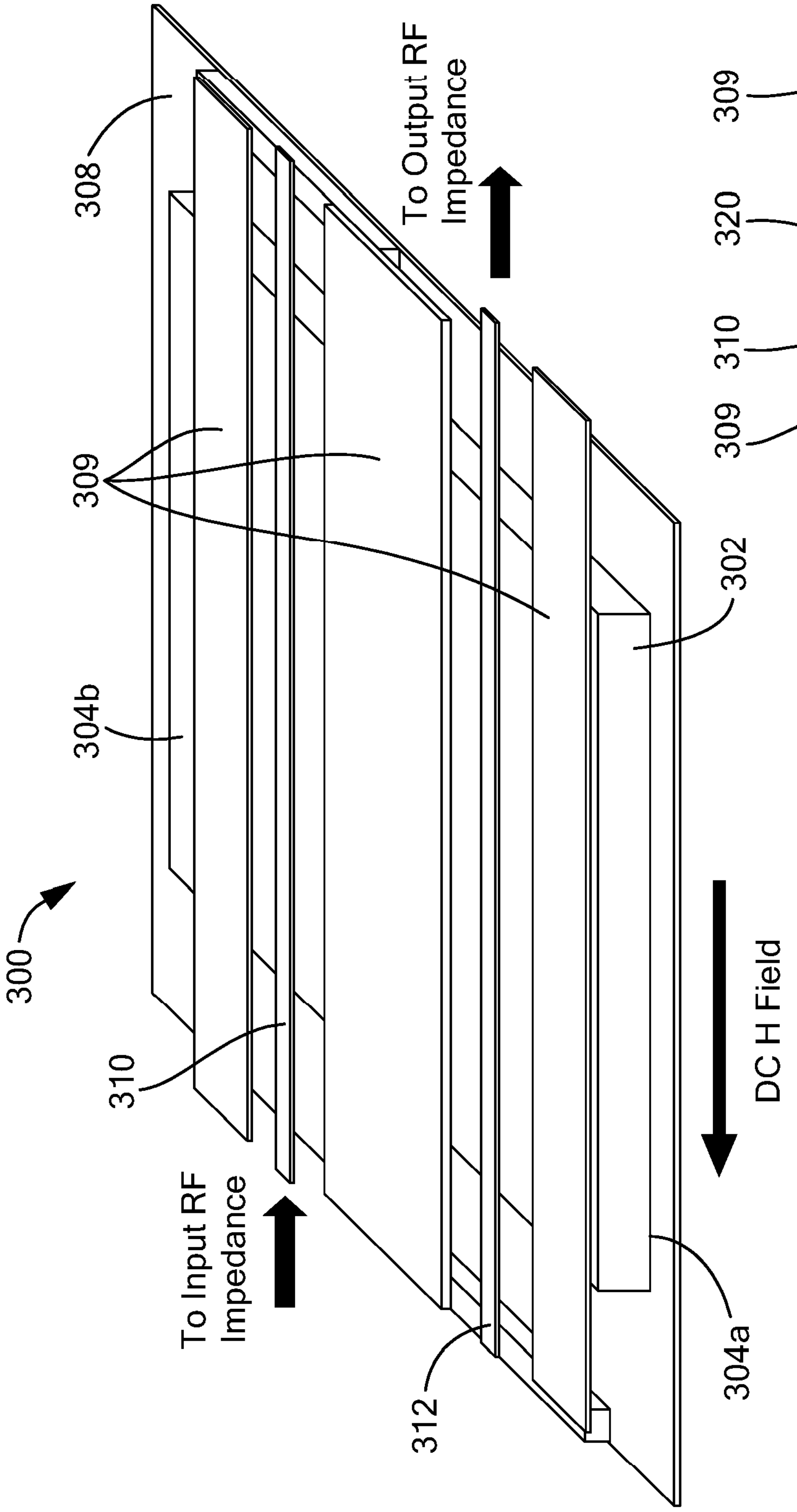
FIG. 3A is an isometric view and FIG. 3B is a cross-sectional view of a MSSW FSL device in accordance with the concepts disclosed herein.
Figure 3B:
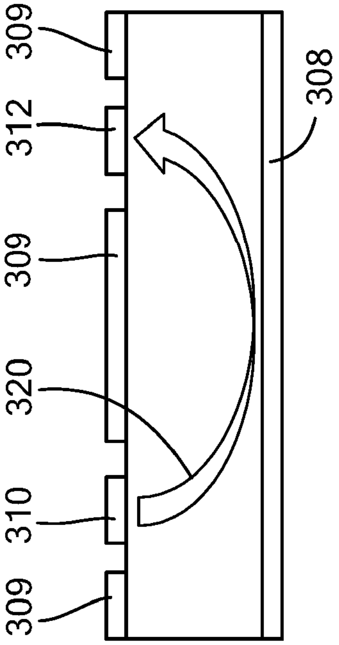

FIGS. 3A and 3B show an example Type B frequency selective limiter (FSL) 300 having a MSSW transducer topology provided in accordance with the concepts disclosed herein. The FSL 300 may have some commonality with the FSL 200 of FIGS. 2B and 2B with the addition of further conductive material 309 on surface 304*b* of the YIG film 302. The conductive material 309 can provide a ground plane on the upper surface 304*b* of the free-standing YIG film. An illustrative metal mode MSSW propagation path 320 is shown in FIG. 3B.

It is understood that amount and geometry of the further conductive material 309 on the upper surface 304*b* of the YIG film 302 can vary to the meet the needs of a particular application. For example, the number and width of strips of conductive material 309 can vary to cover a selected area of the YIG film. In some embodiments, the conductive material 309 is symmetrical with respect to an axis centered on a midpoint of a side of the YIG film. In other embodiments, the conductive material 309 is not symmetrical.

Figure 4A:
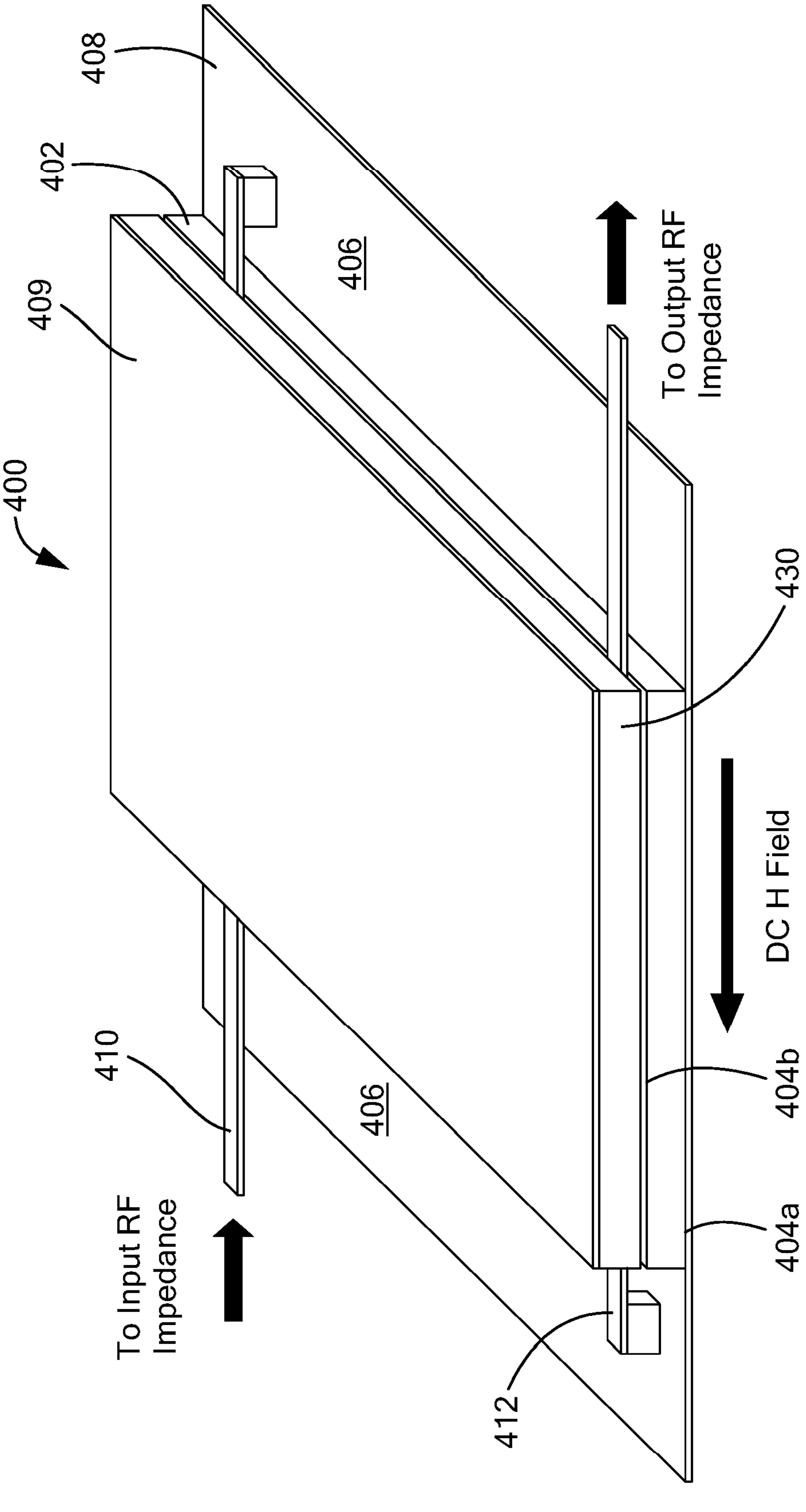
FIG. 4A is an isometric view and FIG. 4B is a cross-sectional view of a MSSW FSL device in accordance with the concepts disclosed herein.
Figure 4B:
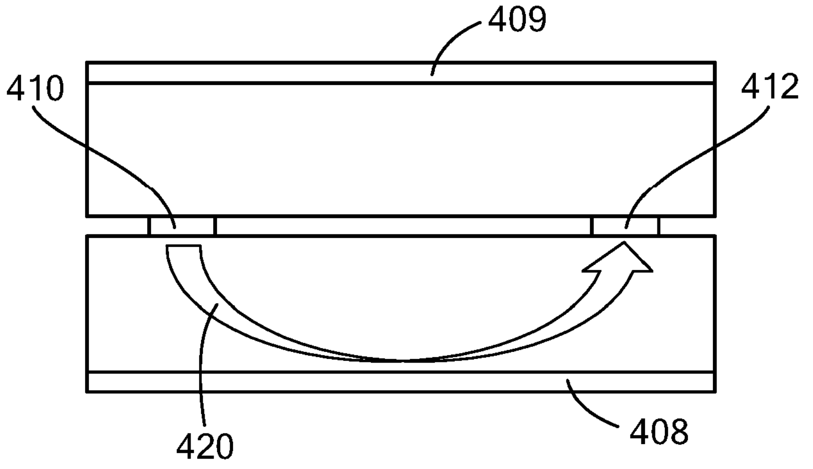

FIGS. 4A and 4B a further embodiment of a MSSW FSL device 400 including a free-standing YIG film 402 having a first surface 404*a* disposed or otherwise provided on a first surface 406 of a first conductive layer 408, such as a metal RF ground plane. First and second MSSW transducers 410, 412 are disposed or otherwise provided on a second, opposite surface 404*b* of the YIG film 402. The first and second transducers 410, 412 are electrically coupled to the first conducive layer 408, which provides an RF ground plane. A stripline substrate 430 is disposed between the YIG film 402 and a second conductive layer 409, which may be coupled to the same ground as the first conductive layer 408, or a different ground plane. An illustrative metal mode MSSW propagation path 420 is shown in FIG. 4B.

Figure 5:
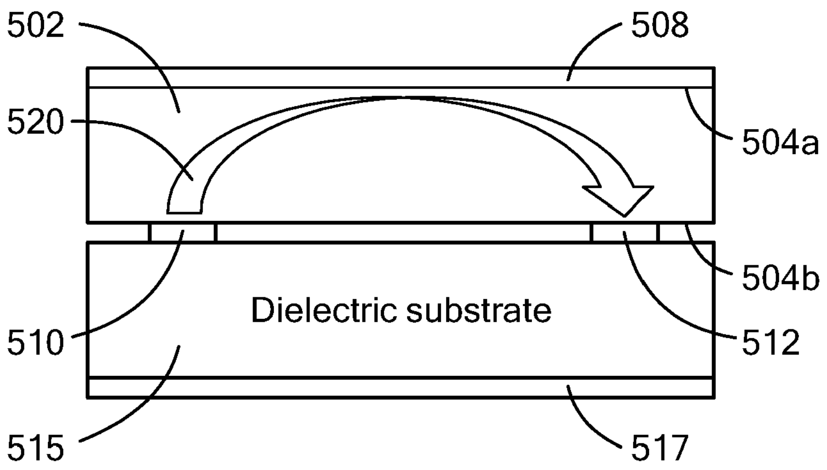
FIG. 5 is a cross-sectional view of a Type A MSSW FSL device in accordance with the concepts disclosed herein.

FIG. 5 shows a further embodiment of a MSSW FSL device 500 including a free-standing YIG film 502 having a first surface 504*a* disposed or otherwise provided on a first conductive layer 508. First and second MSSW transducers 510, 512 are disposed or otherwise provided on a second, opposite surface 504*b* of the YIG film 502. A dielectric layer 515 is disposed between the YIG film 502 and a second conductive layer 517. An illustrative metal mode MSSW propagation path 520 is shown. The MSSW FSL device 500 may be considered a Type A device.

Figure 6:
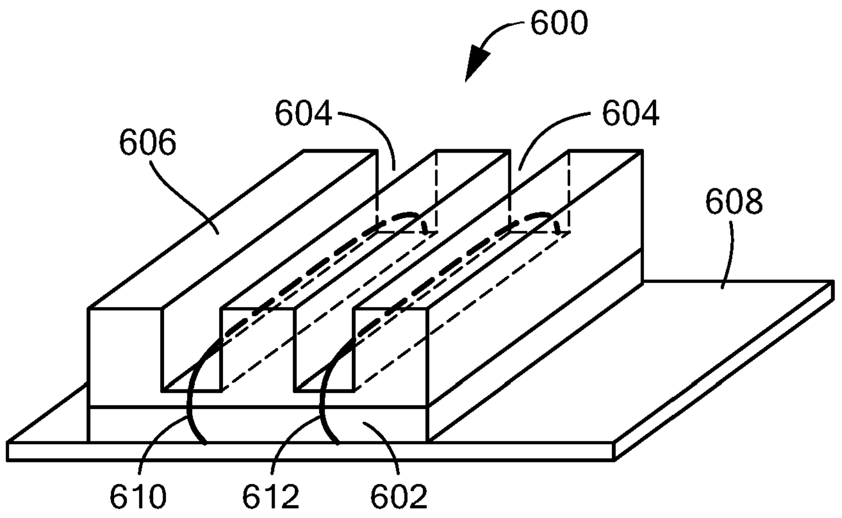
FIG. 6 is an isometric view of a FSL device in accordance with the concepts disclosed herein.

FIG. 6 shows a further embodiment of a MSSW FSL device 600 having a YIG film 602. In an example embodiment, a series of grooves 604 are formed, such as by sawing, in GGG substrate material 606 on which the YIG film 602 was formed. In embodiments, a predetermined amount in order of 1 mil, for example, remains on the YIG film 602, which may have a thickness in the order of 4 mils. The YIG film 602 is placed on a layer of conductive material 608, which may provide a ground plane. In example embodiments, transducers 610, 612 are formed as in Type B device, such as those described above. In some embodiments, the transducers 610, 612 comprise gold wire.

It is understood that the thickness of the GGG, the number, depth, and geometry of the grooves in the GGG, the thickness of the YIG film, the type of transducer, etc., can vary to meet the needs of a particular application without departing from the scope of the invention as claimed.

Figure 7:
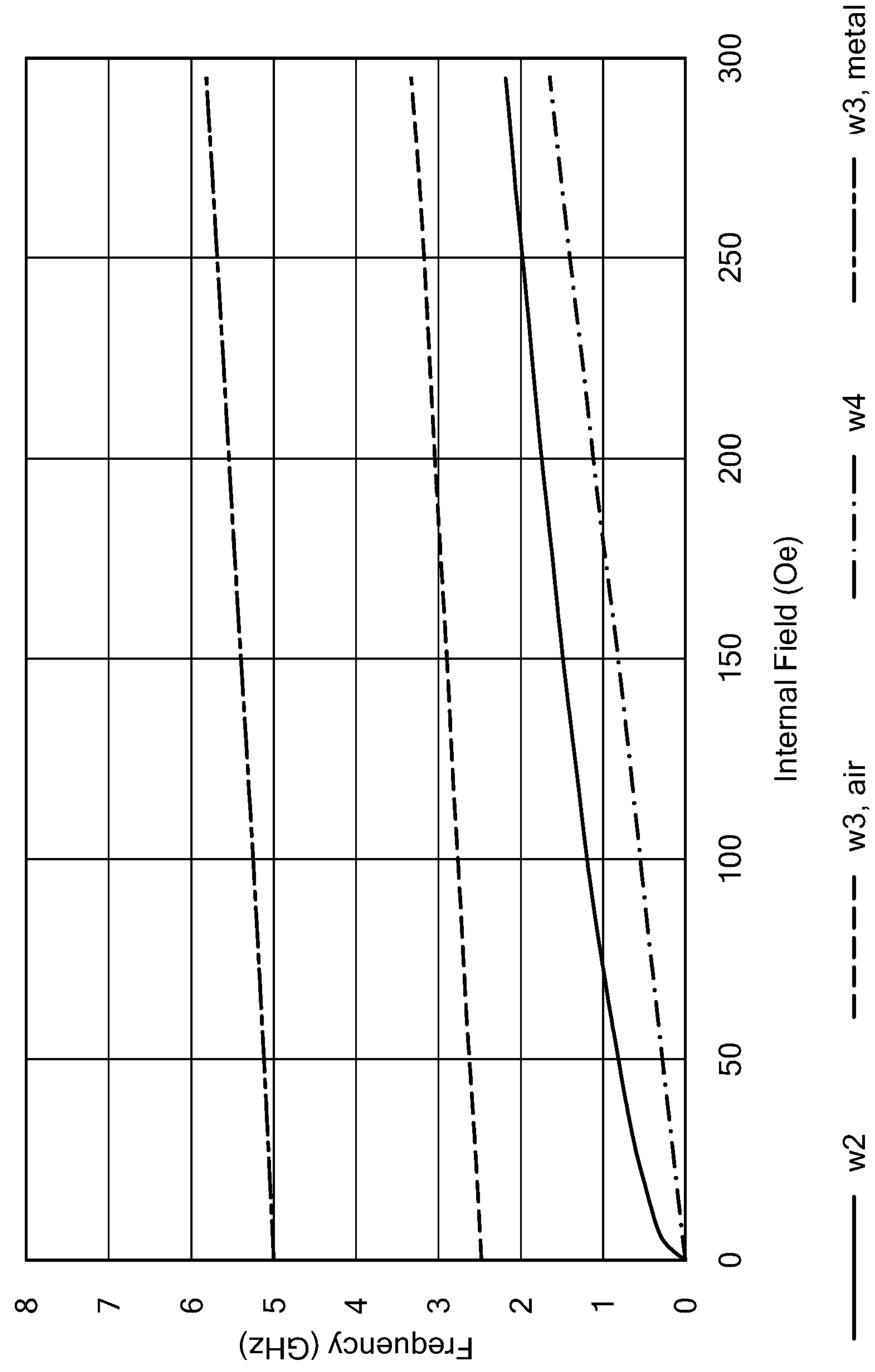
FIG. 7 is a plot of internal magnetic field vs. frequency illustrating lower and upper cutoff frequencies of MSSWs and Spinwaves.

FIG. 7 shows lower and upper cutoff frequencies for and an example embodiment of a MSSW FSL, such as the MSSW FSL of FIG. 2B. w2 refers to the MSSW minimum frequency, w3—air, refers to the MSSW on YIG-air boundary maximum frequency, w3—metal, refers to the MSSW on YIG-metal boundary maximum frequency, and w4 refers to w/2 spinwave minimum frequency. MSSWs propagate between the w2 and w3 frequencies. For an MSSW FSL to function, both w2 and w3 have to be above w4 for the non-linear interaction between the MSSWs and short wavelength spinwaves to occur.

The illustrative plot in FIG. 7 of internal magnetic field vs. frequency shows lower and upper cutoff frequencies of MSSWs and Spinwaves where:

w2=MSSW min. frequency; and w3=MSSW on YIG-Air boundary max. frequency.

$$\omega_2=\sqrt{\gamma(H_{\text{internal}}[H_{\text{internal}}+4\pi M])}$$

$$\omega_3=\gamma(H_{internal}+2\pi M)$$

$$\omega_{3,metal}=\gamma(H_{internal}+4\pi M)$$

$$\psi_4=2\gamma(H_{internal})$$

$$\gamma=2.8\ \text{MHz/Oersted}$$

$$4\pi M=1780\ \text{Gauss}$$

When the surface of the YIG film 202 (FIG. 2B) is covered with metal 208, e.g., ground plane, or a metal sheet is placed in close proximity to the surface of the YIG, w3, metal becomes the new upper frequency cutoff for MSSW propagation. In embodiments, the metal 208 should cover the entire film surface 204*a* such that the MSSWs propagate from the moment the waves leave the transducers 210, 212.

It will be appreciated that this makes launching of MSSWs in this YIG-metal condition using conventional YIG on GGG difficult, because the only free YIG surface must be completely covered in metal, which means only certain types of excitation transducers can be used, such as slot line, or co-planar waveguide (CP).

Figure 8:
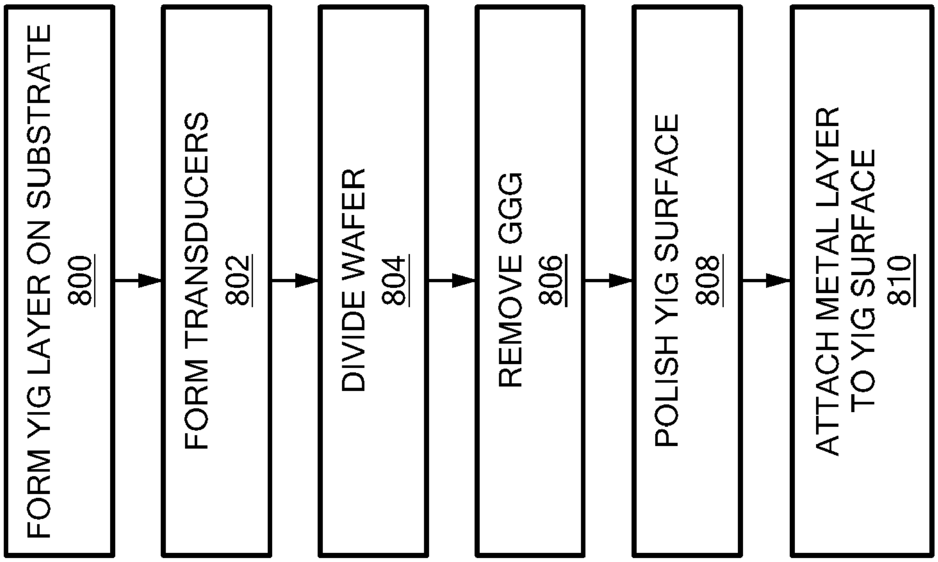
FIG. 8 is a flow diagram of example processing steps for fabricating a MSSW FSL device.

FIG. 8 shows an example sequence of steps for providing a MSSW FSL device in accordance with example embodiment of the invention. In embodiments, MSSW FSL devices can be fabricated in a number of ways that leverage the so-called metal-YIG mode of propagation. In step 800, a YIG film is formed on GGG substrate, for example. In step 802, transducers may be first deposited on the free side of the YIG on a GGG wafer. In step 804, the wafer can be singulated (e.g., divided) into individual devices and in step 806, the GGG substrate can be removed. Such removal may be accomplished, for example, using a lapping procedure. Other techniques may also be used. It should be noted that YIG grown using Liquid Phase Epitaxy may be deposited on both sides of the GGG wafer, so the "extra" layer of YIG can be removed along with the GGG at this time. At the end of the removal process, once the GGG is removed from the YIG layer with printed transducers, the surface of the YIG may be polished in step 808. In step 810, a metal layer may be attached to the YIG film. It is understood that the order of the processing steps described above can vary.

In some embodiments, a YIG film may be grown on a surface of a substrate (e.g. a GGG substrate) using Liquid Phase Epitaxy and subsequently separated from the substrate and coupled to a surface of the RF ground plane.

Ideally, all of the GGG is removed from the YIG layer, however, there may be residual GGG. In embodiments, suitable techniques for stock removal of 500 microns of GGG (typical GGG wafer thickness) include fixed and loose abrasive lapping using grinding media such as Silicon Carbide, Alumina, Boron Carbide on a rotating iron lapping plate. After the GGG is removed using lapping, polishing may be done with loose abrasive on special polishing pads. In some embodiments, a last polishing may be done using chemical mechanical polishing (CMP). In embodiments, such polishing may be accomplished, for example, via a Chemical Mechanical Polishing (CMP) process (e.g. a CMP with fine colloidal silica nanoparticles may be used). Such a polishing process restores the now free YIG surface to an optical polish. Once the back side of the YIG is smoothed to within a desired range of roughness, the surface can be either sputtered with a conductor, or the bare YIG surface can be simply glued to a metal ground as part of an MSSW FSL device. In embodiments, the YIG material may be smoothed to a surface roughness in the range of 0-1000 nm peak-to-peak (pk-pk) and preferably to a surface roughness in the range of 0-500 nm pk-pk and even more preferably to a surface roughness in a surface roughness in the range of 0-10 nm pk-pk.

The transducers fabricated on the exposed (or "top") surface of the YIG can be coupled to input/output feed circuits. Such coupling may be accomplished, for example, using wire bonds. Other techniques may also be used.

Additional features may be fabricated or otherwise provided onto an exposed surface of a YIG film. Such additional features may be provided either before or after separation of the YIG film from the GGG wafer (e.g. before or after the removal of the GGG layer from the YIG film). Such additional features include, but are not limited to, electrically conductive vias to allow for the use of surface mountable technology (SMT) directly on the YIG crystal to connect the top-side transducers to input and output feed networks without the use of wirebonds.

Materials capable of absorbing or reflecting MSSWs known to those skilled in the art can be deposited or otherwise provided on the free side of a YIG film (either before or after the removal of the GGG layer from the YIG film).

In some embodiments, before removing the GGG, the YIG surface could be covered with metal. Once the GGG is removed and the YIG is polished, it can be laid directly on a pair of Type A transducers and coupled to the transducers. Wire bonds or other interconnect technology (Flip Chip, SMT) can be used to connect the upper metal covered surface of the YIG to a RF ground plane.

In some embodiments, MSSW FSLs can be fabricated without any metal deposition or processing on the YIG. The GGG can be removed as described previously, and the YIG polished. The free YIG crystal can be bonded to a RF ground plane and wirebonds stretching across the YIG from input to ground and from output to ground. This results in a very compact and low cost design.

Figure 9:
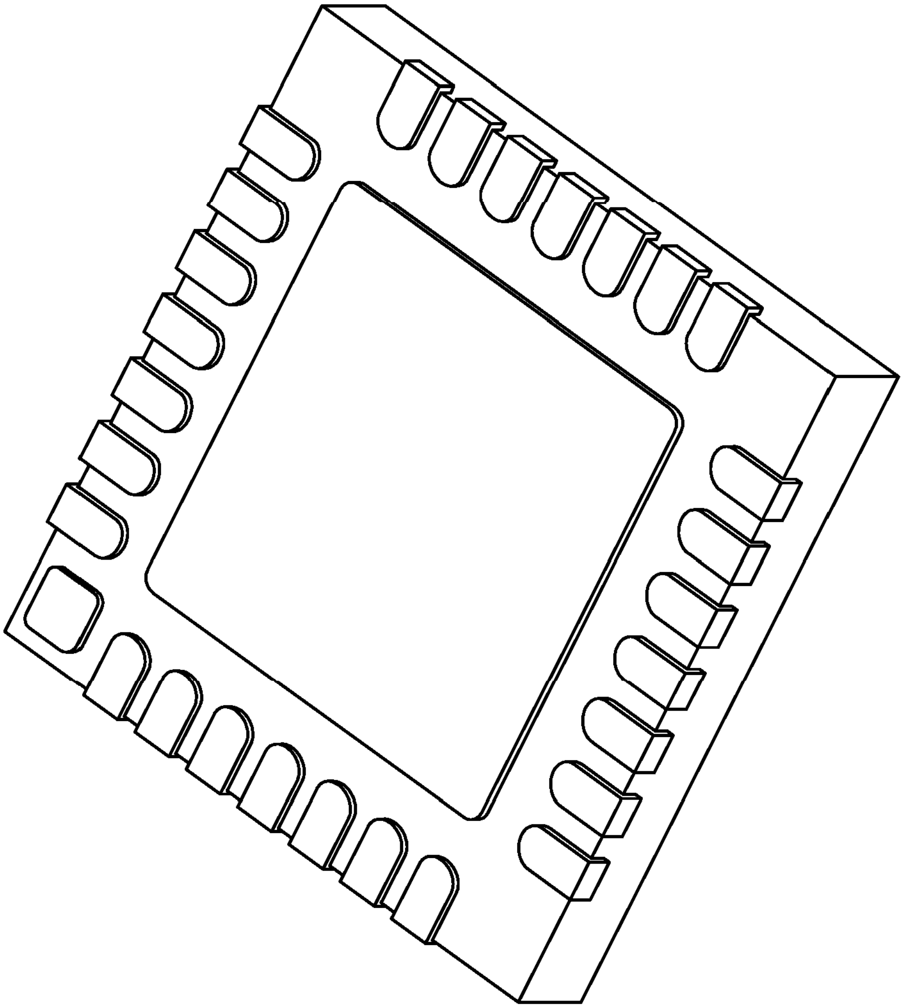
FIG. 9 is a pictorial representation of a FSL device in a QFN type IC package.

The free YIG crystal can be coupled to a ground plane (e.g. directly or indirectly coupled to the RF ground plane in a semiconductor IC package (e.g. a quad-flat no lead (QFN) semiconductor IC package) and wire bonds or other electrical connections can be provided to form the transducers inside the IC package. FIG. 9 shows an example QFN type IC package for a MSSW FSL in accordance with example embodiments of the invention.

Figure 10:
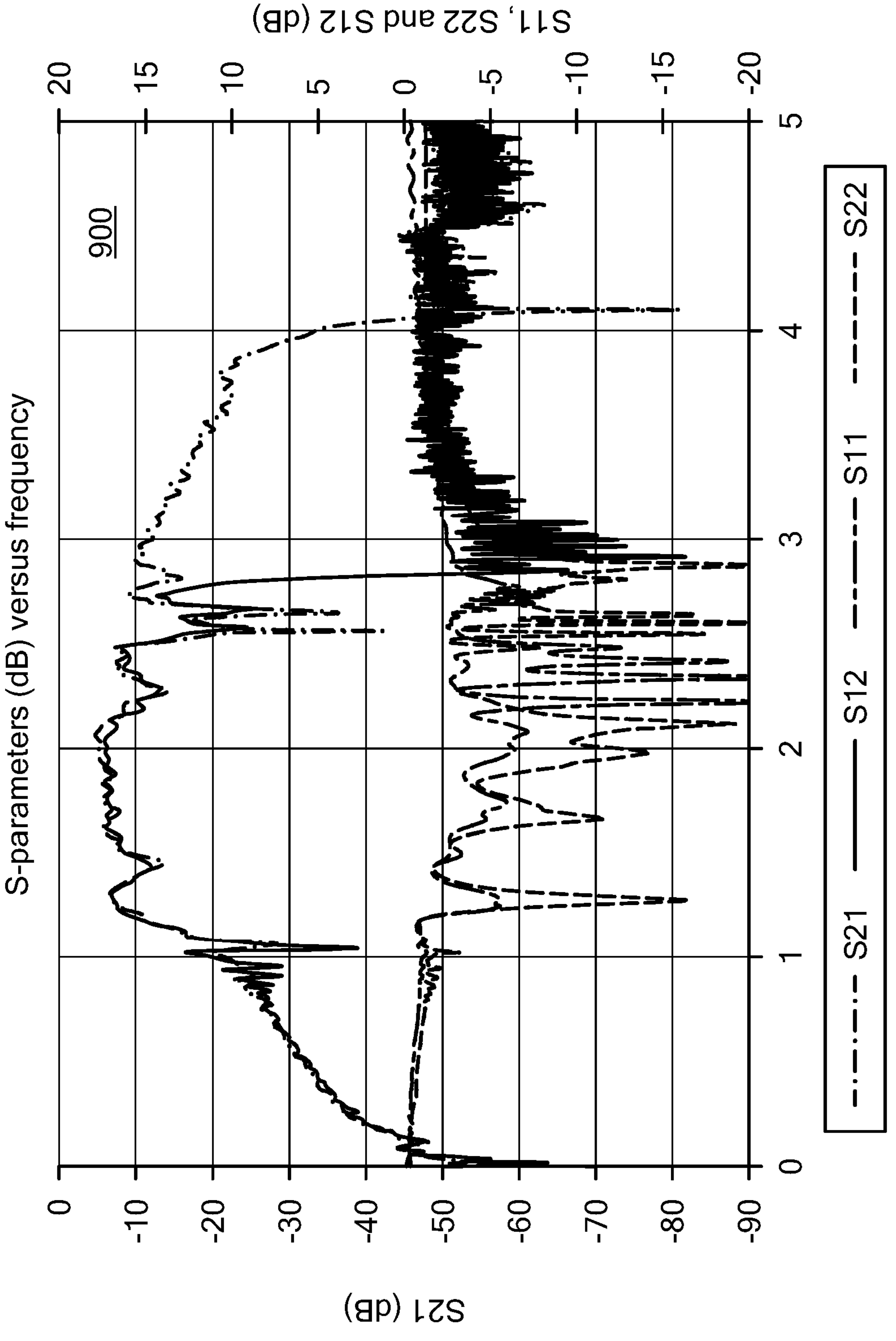
FIG. 10 is a plot of measured S-parameters of a Type B MSSW transducer having a topology which may be the same as or similar to the Type B MSSW transducer topology illustrated in FIG. 2B.

FIG. 10 shows a plot of measured S-parameters of a Type B MSSW transducer having a topology which may be the same as or similar to the Type B MSSW transducer topology illustrated in FIG. 2B. The plot of dB versus frequency indicates that a Type B MSSW transducer provided in accordance with concepts described herein is provided having extended bandwidth 900 in one direction of propagation (S21). In example embodiment, with reference to w3 air and w3 metal in FIG. 7, the extended bandwidth 900, as compared to prior art MSSW FSLs, is above about 3 GHz. This corresponds to the waves propagating on the surface of the YIG near the RF ground plane. It should be noted that S21 is shown in a dB scale on the left side of the plot and S11, S22, and S12 are shown in a dB scale on the right side the plot.

Figure 11:
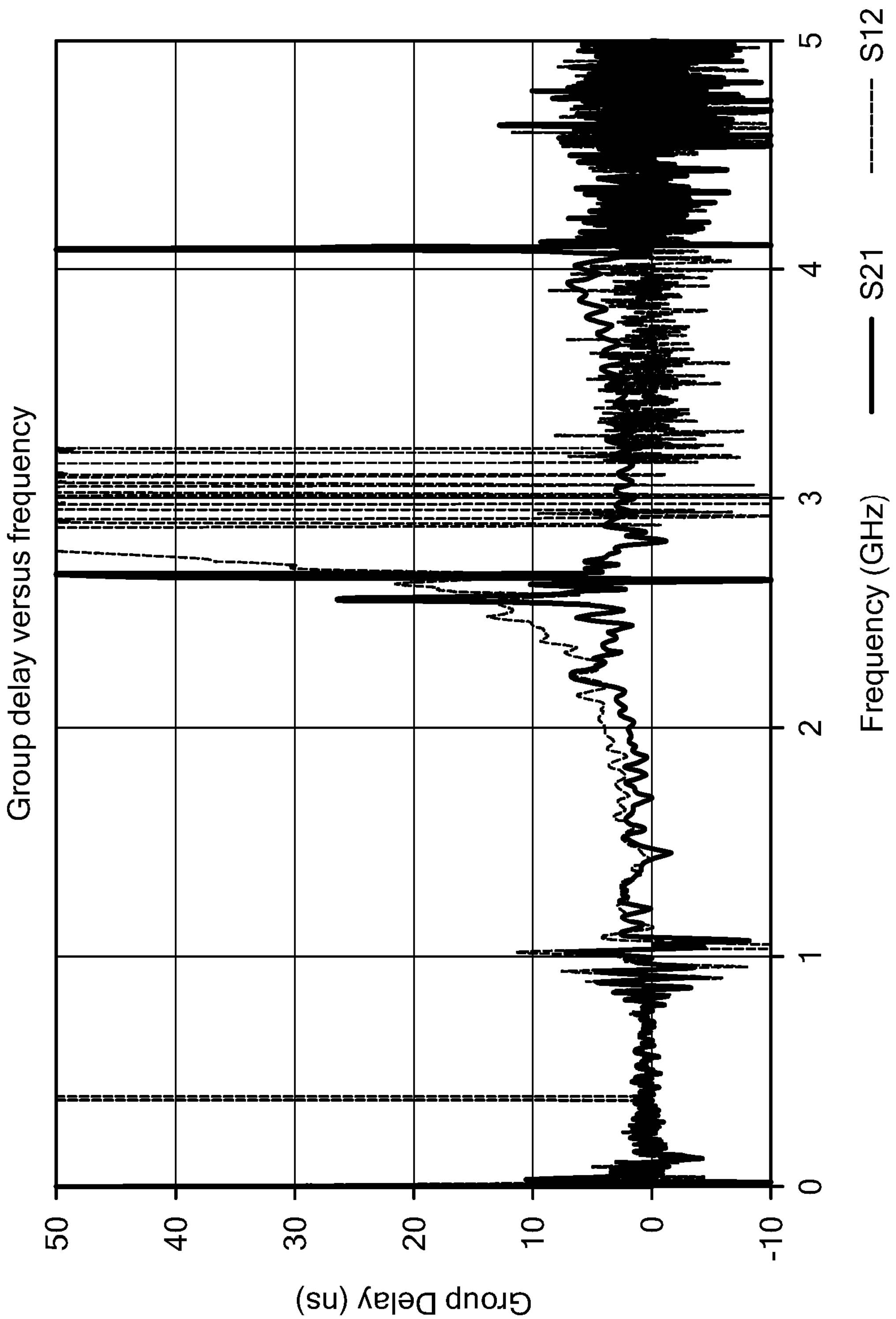
FIG. 11 is a plot of group delay vs. frequency for S21 and S12 transmission parameters of a Type B MSSW transducer having a topology which may be the same as or similar to the Type B MSSW transducer topology illustrated in FIG. 2B.

FIG. 11 shows a plot of group delay vs. frequency for S21 and S12 transmission parameters of a Type B MSSW transducer having a topology which may be the same as or similar to the Type B MSSW transducer topology illustrated in FIG. 2B. FIG. 11 illustrates increased bandwidth and reduction in group delay variation across frequency in the waves traveling on the YIG-metal surface (S21). It is understood that group delay refers to a change in propagation speed through a material over frequency. As can be seen, signal propagation in the S21 direction is relatively flat, e.g., less dispersion, than in conventional FSL limiters.

Figure 12:
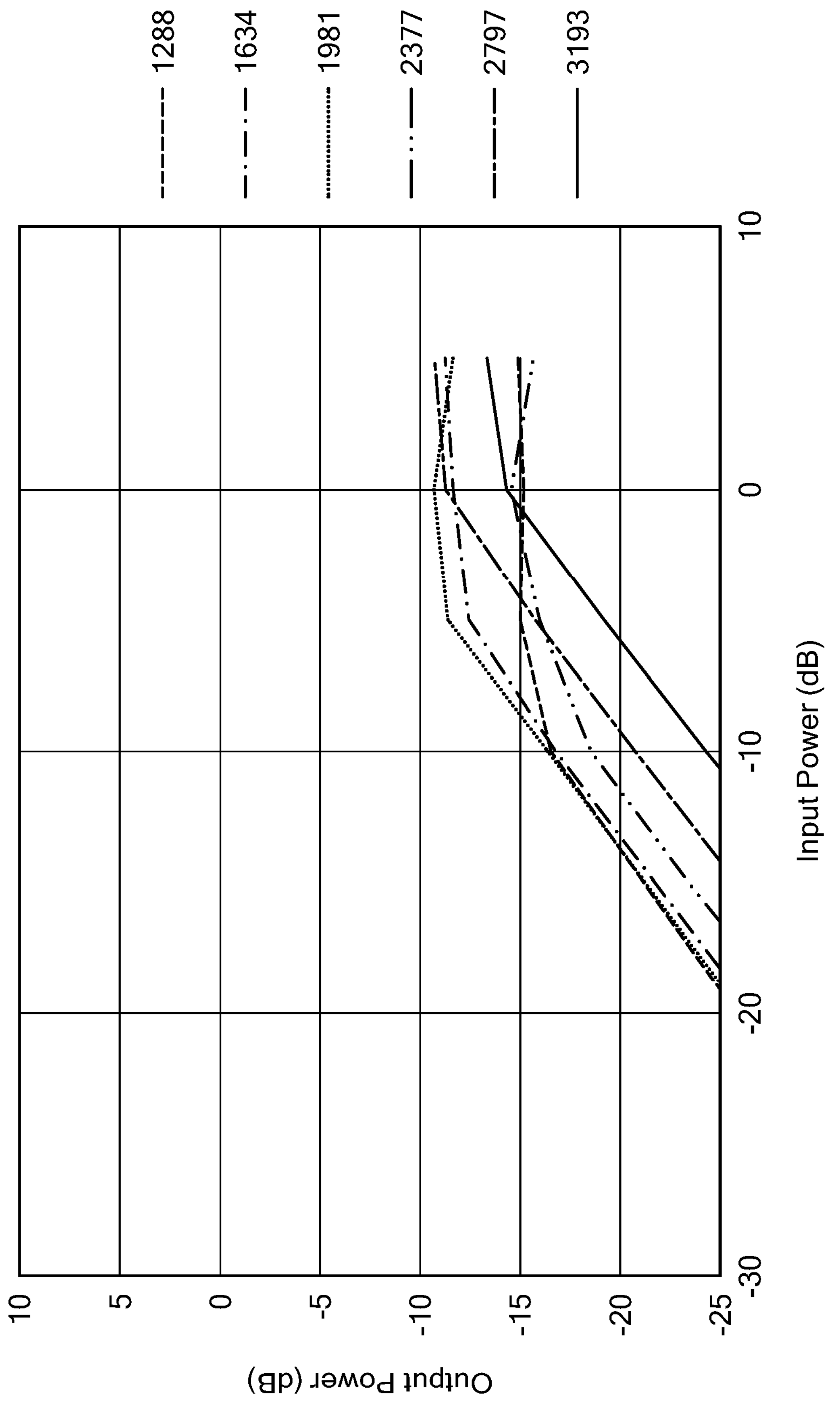
FIG. 12 is a plot of measured input power in ($P_{in}$) vs. output power ($P_{out}$) (PIPO) for an MSSW FSL operating in a metal-mode regime.

FIG. 12 shows a plot of measured input power in ($P_{in}$) vs. output power ($P_{out}$) (PIPO) over frequency for an example embodiment of a MSSW FSL operating in a metal-mode regime. The power sweep was taken in the S21 direction as shown in the low power S-parameters in FIG. 10.

Various embodiments of the concepts systems and techniques are described herein with reference to the related drawings. Alternative embodiments can be devised without departing from the scope of the described concepts. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to element or structure "A" over element or structure "B" include situations in which one or more intermediate elements or structures (e.g., element "C") is between element "A" and element "B" regardless of whether the characteristics and functionalities of element "A" and element "B" are substantially changed by the intermediate element(s).

The following definitions and abbreviations are to be used for the interpretation of the claims and the specification.

As used herein, the terms "comprises," "comprising," "includes," "including," "has," "having," "contains" or "containing," or any other variation thereof, are intended to cover a non-exclusive inclusion. For example, a method, article, or apparatus that comprises a list of elements is not necessarily limited to only those elements but can include other elements not expressly listed or inherent to such method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment," "an embodiment," "an example embodiment," or variants of such phrases indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection knowledge of one skilled in the art to affect such feature, structure, or characteristic in connection with other embodiments whether or not explicitly described.

Furthermore, it should be appreciated that relative, directional or reference terms (e.g. such as "above," "below," "left," "right," "top," "bottom," "vertical," "horizontal," "front," "back," "rearward," "forward," etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations. For example, with respect to an object or structure, an "upper" surface can become a "lower" surface simply by turning the object over. Nevertheless, it is still the same surface and the object remains the same. Also, as used herein, "and/or" means "and" or "or", as well as "and" and "or." Moreover, all patent and non-patent literature cited herein is hereby incorporated by references in their entirety.

The terms "disposed over," "overlying," "atop," "on top," "positioned on" or "positioned atop" mean that a first element, such as a first structure, is present on a second element, such as a second structure, where intervening elements or structures (such as an interface structure) may or may not be present between the first element and the second element. The term "direct contact" means that a first element, such as a first structure, and a second element, such as a second structure, are connected without any intermediary elements or structures between the interface of the two elements.

Having described exemplary embodiments, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A device, comprising:

a free-standing Yttrium Iron Garnet (YIG) film having first and second opposing surfaces;

a metal layer disposed on a first one of the first and second opposing surfaces of the YIG film to provide the YIG film with a metalized surface; and a first transducer disposed on a second one of the first and second surfaces of the YIG film and configured to launch magnetostatic surface waves (MSSWs) on the second one of the first and second surfaces of the YIG film.

2. The device according to claim 1, further comprising a second transducer disposed on the second one of the first and second surfaces of the YIG film, the second transducer having a first end coupled to the metalized surface of the YIG film, wherein the second transducer is configured to launch MSSWs on at least one of the first and second surfaces of the YIG film.

3. The device according to claim 2, wherein the first and second transducers comprise microstrip transducers.

4. The device according to claim 2, wherein the first and second transducers comprise stripline transducers.

5. The device according to claim 2, wherein the first and second transducers comprises coplanar waveguide (CPW) transducers.

6. The device according to claim 2, wherein the first and second transducers comprise wirebonds.

7. The device according to claim 2, wherein the metal layer covers an entirety of the first one of the surfaces of the YIG film.

8. The device according to claim 2, wherein the device is provided as an integrated circuit.

9. The device according to claim 8, wherein the integrated circuit comprises a quad-flat no lead (QFN) type package.

10. The device according to claim 8, further comprising:

an input circuit;

an output circuit; and a plurality of conductive vias disposed to electrically couple the first and second transducers to the input and output circuits.

11. The device according to claim 1, wherein the metal layer comprises a radio frequency (RF) ground plane.

12. The device according to claim 1, wherein:

the device comprises a frequency selective limiter (FSL) device; and the first transducer has a first end coupled to the metalized surface.

13. The device according to claim 1, wherein the device comprises a Type A MSSW frequency selective limiter (FSL) device.

14. The device according to claim 1, wherein the device comprises a Type B MSSW frequency selective limiter (FSL) device.

15. The device according to claim 1, wherein the YIG film has a thickness in a range of about 50 to about 500 microns.

16. The device according to claim 1, wherein the YIG film has a thickness that is less than or equal to 100 microns.

17. The device according to claim 2, wherein the first transducer and the second transducer are configured to launch MSSWs on the first and second surfaces of the YIG film.

18. The device according to claim 2, wherein grounded ends of the first transducer and the second transducer are located at opposite ends of the YIG film.

19. The device according to claim 2, further comprising a direct current (DC) biasing field circuit configured to apply a DC biasing field in a plane parallel to a plane in which the YIG film lies.

20. The device according to claim 2, wherein the metal layer comprises a first conductive layer, the device further comprising:

a dielectric layer; and a second conductive layer, wherein the dielectric layer is disposed between the YIG film and the second conductive layer.

* * * * *